US012782238B2

(12) United States Patent
Vincent

(10) Patent No.: US 12,782,238 B2
(45) Date of Patent: Nov. 3, 2026

(54) APPARATUS AND METHOD FOR TESTING TIRES

(71) Applicant: Bridgestone Europe NV/SA [BE/BE], Zaventem (BE)

(72) Inventor: Bram Vincent, Zaventem (BE)

(73) Assignee: Bridgestone Europe, NV/SA

( * ) Notice: Subject to any disclaimer, the term of this patent is extended or adjusted under 35 U.S.C. 154(b) by 253 days.

(21) Appl. No.: 18/719,474

(22) PCT Filed: Dec. 12, 2022

(86) PCT No.: PCT/EP2022/085361
§ 371 (c)(1),
(2) Date: Jun. 13, 2024

(87) PCT Pub. No.: WO2023/110736
PCT Pub. Date: Jun. 22, 2023

(65) Prior Publication Data

US 2025/0060282 A1 Feb. 20, 2025

(30) Foreign Application Priority Data

Dec. 14, 2021 (EP) .................................... 21214356

(51) Int. Cl.
*G01M 17/02* (2006.01)

(52) U.S. Cl.
CPC ................................ *G01M 17/022* (2013.01)

(58) Field of Classification Search
CPC .................................................. G01M 17/022
See application file for complete search history.

(56) References Cited

U.S. PATENT DOCUMENTS 6,907,777 B2 6/2005 Weiss
9,157,834 B2 * 10/2015 Beccavin .............. G01M 17/02
2007/0279827 A1 12/2007 Sinnett et al.
2016/0167466 A1 * 6/2016 Speyer .................. B60C 25/002 73/146.2
2016/0231201 A1 8/2016 Schober
2017/0003240 A1 * 1/2017 Brasch ................ G01M 17/021

FOREIGN PATENT DOCUMENTS

CN 111060327 A 4/2020
KR 102244231 B1 * 4/2021 ............ G01M 17/03

* cited by examiner

*Primary Examiner* — Toan N Pham
(74) *Attorney, Agent, or Firm* — Patterson Intellectual Property Law, PC

(57) ABSTRACT

An apparatus for testing tires comprises a probe having a structure which adjusts to a superficial profile of the tire cavity and comprises an electrically insulating material. A chain mail portion connected to the structure comprises an electrically conductive material, and has a width to engage the surface of the cavity in the area of the crown and, at least partially, in the area of the sidewalls. A roller supports the tire and rotates it around a first central axis, and comprises a central core made of an electrically conductor material, and at least a coating layer, which is applied on the outside of the central core, and has an even thickness. The roller comprises an outer surface having a concave profile facing the tire. A high-voltage test system tests for defects in the carcass and comprises two electrodes defined by the central core and the chain mail portion.

20 Claims, 4 Drawing Sheets

APPARATUS AND METHOD FOR TESTING TIRES

TECHNICAL FIELD

The invention relates to an apparatus and to a method for testing tires.

BACKGROUND ART

The use of retreaded tires has become more and more widespread, said retreaded tires being obtained at the end of a retreading process to which damaged tires are subjected, namely tires having defects such as holes, cracks or irregularities in the innerliner. Before carrying out the retreading process, however, it is extremely important to recognize, in a reliable manner, all the defects present in the tire, in particular on the carcass, and repair them. Even though a visual or mechanical inspection of a carcass is relatively accurate, it often happens that some defects fail to be recognized; these defects can then cause problems during the retreading process or during the use of the retreaded tire on the road, leading to tire failures, safety issues and vehicles stopping.

For this reason, tire testing apparatuses are known, of which the test tires have a toroidal carcass, which internally defines a cavity and supports a pair of sidewalls arranged on the outside of the carcass. Said apparatuses typically comprise a probe obtained by means of at least one plate, to which a number of wire loops are connected, which are designed to slide on the superficial profile of the cavity of the carcass and are made of an electrically conductor material; spreaders which are aimed at widening the carcass to let the probe enter in proximity of the cavity; at least one roller, which is designed to support the tire and cause it to rotate around a central axis and is made of an electrically conductor material; and, finally, a high-voltage test system, which is suited to detect the presence of defects in the carcass and comprises a pair of electrodes, which are defined by the probe and by the roller.

In use, the roller is caused to rotate, so that it causes the tire to rotate around its central axis. When the tire rotates, the probe slides on the surface of the inner cavity and, at the same time, is supplied with high-voltage pulses by a power supply source, thus creating an electric field around the probe. In case the carcass lacks defects (holes, cracks or irregularities in the innerliner, etc.), the carcass provides an insulation between the two electrodes. On the contrary, in case the carcass has defects, the insulation between the two electrodes is not ensured and the defect is detected by a control unit.

However, apparatuses of the type described so far suffer from some drawbacks. In particular, the wire loops defining the probe do not engage, in a reliable and satisfactory manner, the entire surface of the inner cavity which could have defects, namely the crown (the central portion of the carcass) and, to an even greater extent, the sidewalls. Furthermore, probes of the type described above often are relatively large and make it difficult for the probe to be inserted into the inner cavity of the tire and require additional spreaders to enlarge the carcass prior to let the probe enter in the cavity, thereby rendering the apparatus more complex to use.

BRIEF SUMMARY

Therefore, the object of the invention is to provide a reliable apparatus for testing tires which is not affected by the drawbacks of the prior art and, in particular, is easy and economical to be manufactured.

Further object of the invention is to provide a method for testing tires which is not affected by the drawbacks of the prior art and, in particular, is easy and economical to implement.

According to the invention, there are provided an apparatus and a method for testing tires according to the appended claims.

BRIEF DESCRIPTION OF THE DRAWINGS

The invention will now be described with reference to the accompanying drawings, which show some non-limiting embodiments thereof, wherein.

DETAILED DESCRIPTION

Figure 1:
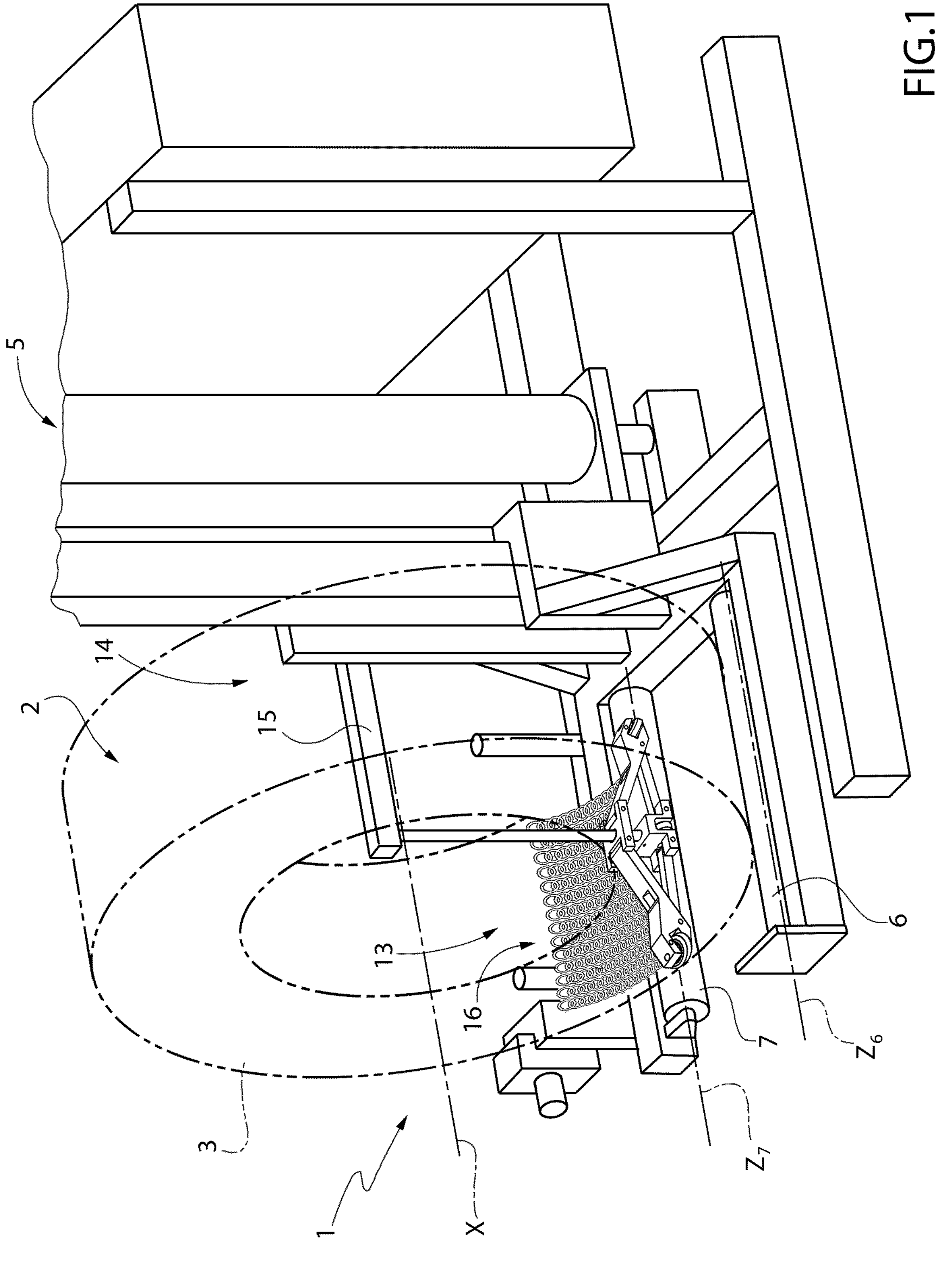
FIG. 1 is a perspective view, in side elevation and with parts removed for greater clarity, of an apparatus for testing tires according to the invention.

With reference to FIG. 1, number 1 indicates, as a whole, an apparatus for testing tires 2 to be retreaded.

The tire 2 comprises a toroidal carcass 3, which consists of a body ply having, on its opposite sides, two annular beads. The carcass 3 supports a pair of sidewalls 4 arranged on the outside of the carcass 3 and extending up to the beads. On the inside of the carcass 3, on the entire available surface (namely, in the area of the central crown and of the sidewalls 4), there is arranged an innerliner, which is impermeable to air, forms an inner coating and has the function of holding air inside the tire 2.

The apparatus 1 comprises a support frame 5, which is suited to support the tire 2 and causes it to rotate around a central axis X of its through motor-driven rollers 6, 7. Preferably, there are a pair of rollers 6, 7 having respective axes $Z_6$ $Z_7$, which are parallel to one another and are parallel to the axis X.

The apparatus 1 further comprises a high-voltage test system 8, which is suited to detect the presence of defects (holes, cracks or irregularities in the innerliner, etc.) in the casing 3.

The high-voltage test system 8 comprises the roller 6 (and, in particular, a central core 9 thereof), which is designed to serve as a first electrode of the high-voltage test system 8, as better described below.

The roller 6 comprises a central core 9, which is a conductor and made of an electrically conductive material, central core 9 is preferably made of a metal material.

The roller 6 further comprises a coating layer 10, which is coaxial to the central core 9 and to the axis $Z_6$. The coating layer 10 has an even thickness and is applied so as to completely and uniformly wound the central core 9. More in detail, the coating layer 10 has a thickness less or equal to 15 mm, preferably ranging from 4 to 15 mm. The coating layer 10 is made of an electrically conductive material.

Preferably, but not limited to, the coating layer 10 is made of a polymer (like, for example, synthetic or natural or silicone based rubber). In use, the coating layer 10 is interposed between the carcass 3 and the central core 9. Surface resistivity of an outer surface 11 of the roller 6 is comprised in the range $10{*}e^3$-$10{*}e^6$ Ω/sq cm.

Outer surface 11 has a concave profile, with the concavity facing the tire 2. More in detail, the central core 9 is provided with an outer surface 12 having a concave profile, with the concavity facing the tire 2, with the interposition of the coating layer 10.

The bending radius of the concave profile of the outer surface 11 ranges from 68 to 240 centimetres; preferably, the bending radius of the concave profile of the outer surface 11 is equal to 103 centimetres.

The support frame 5 further comprises a probe 13. The probe 13 is conveniently obtained by means of a robot 14 provided with a movable arm 15 and suited to be inserted into the tire 2 so as to slide on the profile of an inner cavity 16 of the tire 2. The expression "profile of the inner cavity 16" indicates a superficial profile of the tire 2 or of the carcass 3, in the area of the portion of the tire 2 that is going to come into contact with the asphalt, namely in the area of the crown and, at least partially, of the sidewalls 4.

The probe 13 comprises a structure 17, which is designed to adjust to the superficial profile of the inner cavity 16. The structure 17 is made of an electrically non-conductive or insulating material. The structure 17 is made, for example, of PLA or ABS or nylon.

The structure 17 comprises a central pin 18 having an axis $X_{18}$ and having one of its ends connected to a fixed bar 19 provided with a guide roller 20, which is designed to slide on the profile of the inner cavity 16. According to a preferred variant, the fixed bar 19 has, at the front, a U-shape provided with two side appendages. The structure 17 further comprises two arms 21A, 21B articulated to one another and arranged in a mirror-like manner relative to the axis $X_{18}$, only one of them being described in the description below.

Figure 2:
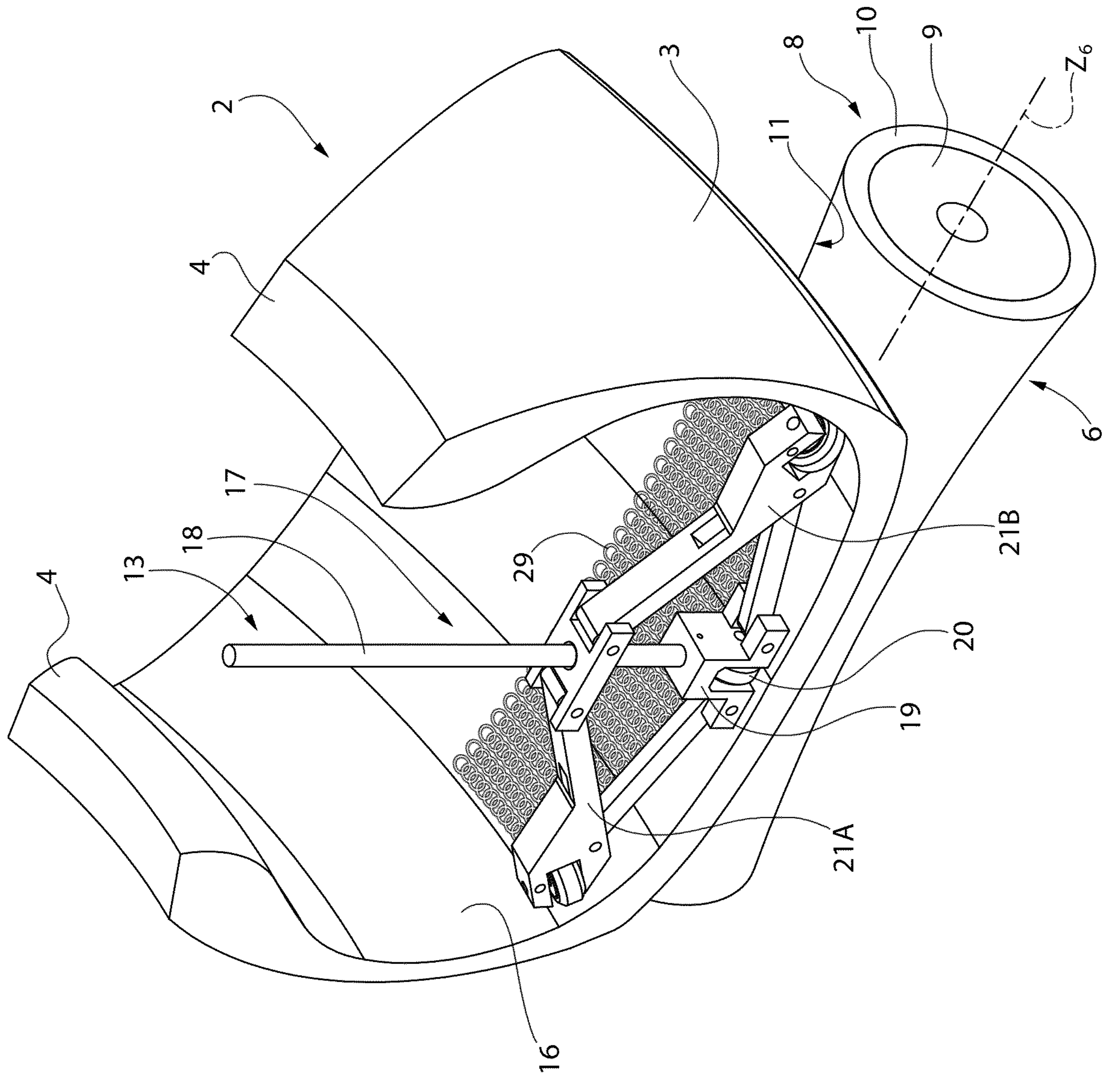
FIG. 2 is a perspective view, in side elevation and with parts removed for greater clarity, of a detail of the apparatus of FIG. 1.
Figure 3:
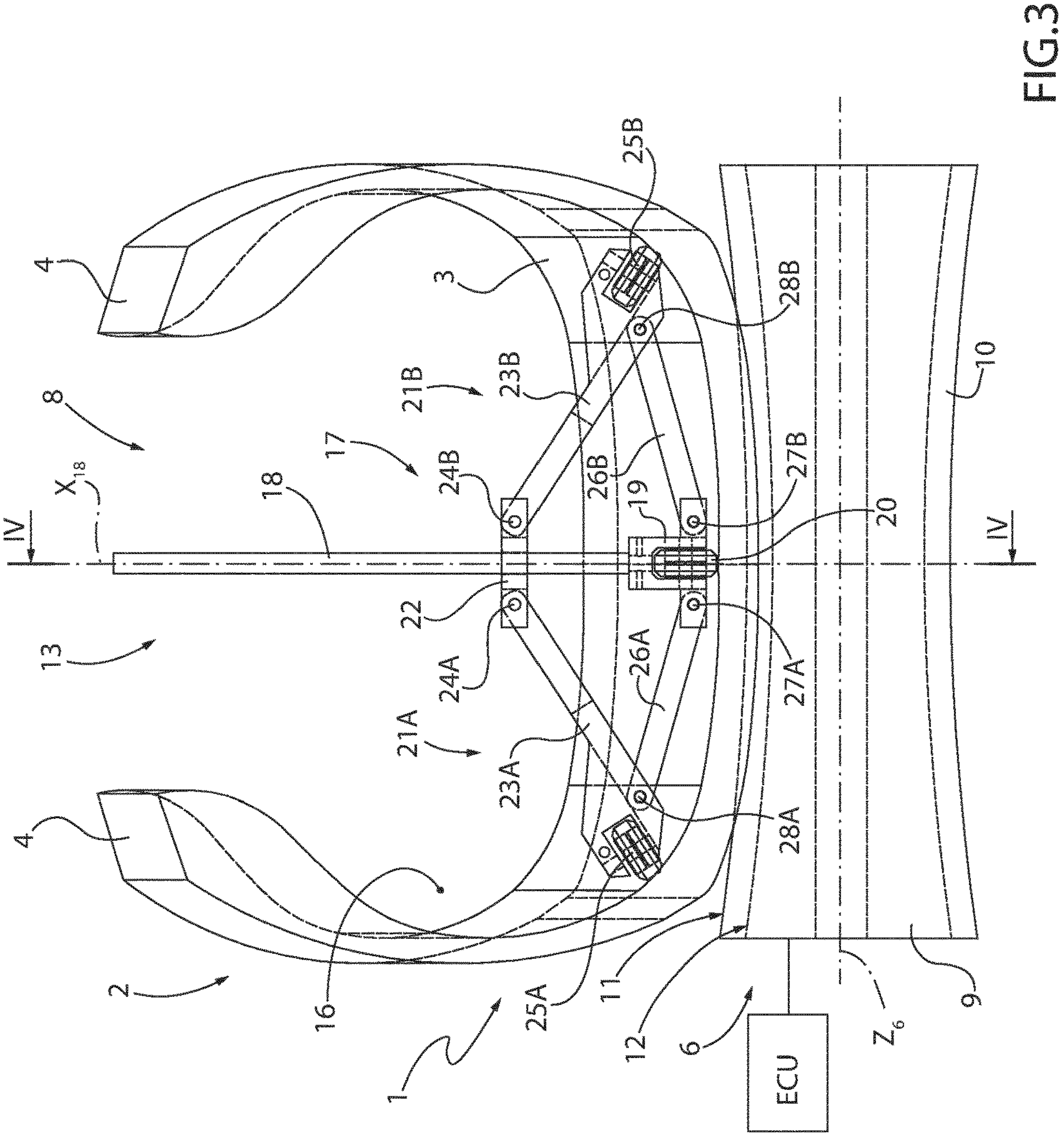
FIG. 3 is a front view of the detail of FIG. 2.
Figure 5:
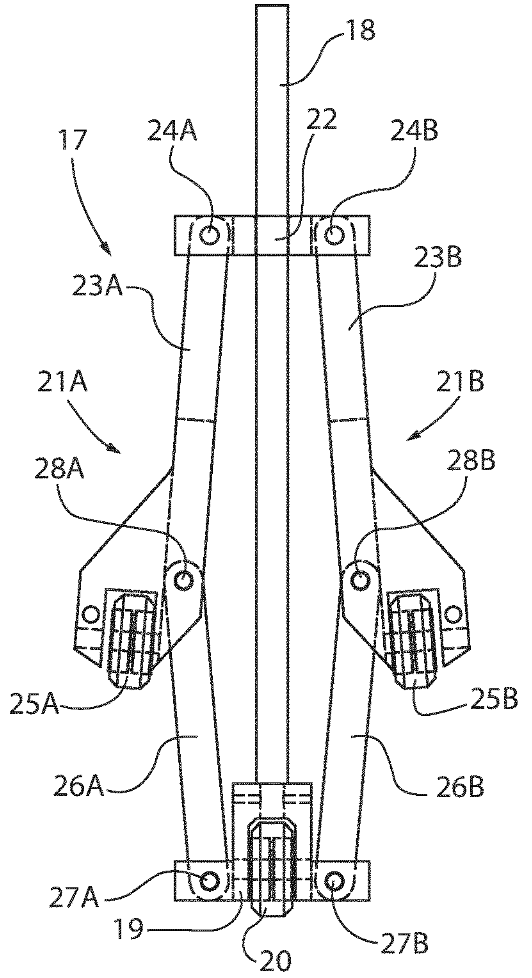
FIG. 5 is a front view of a detail of a probe of the apparatus of FIG. 1 in a closed configuration.
Figure 6:
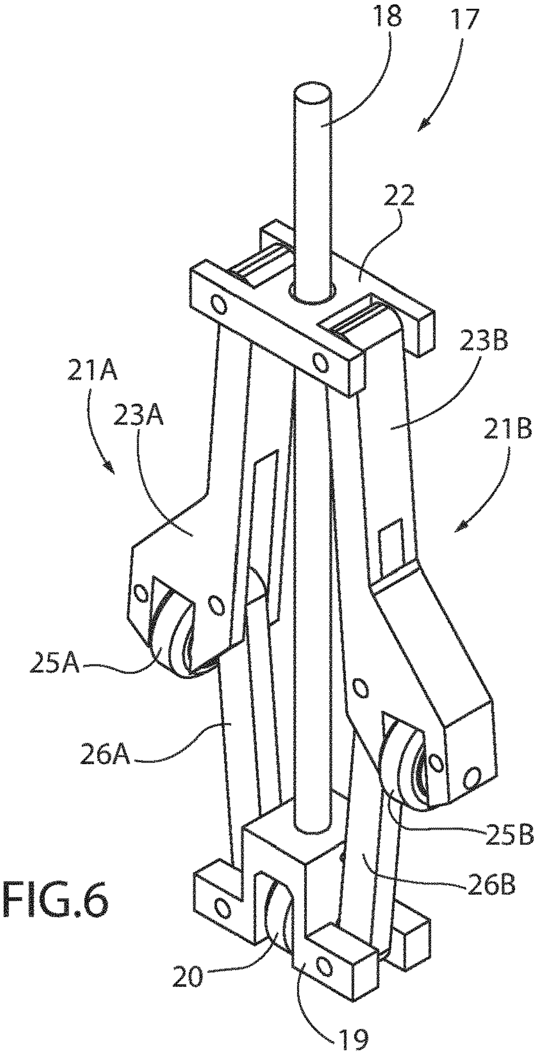
FIG. 6 is a perspective, side elevation view of the detail of FIG. 5.
Figure 7:
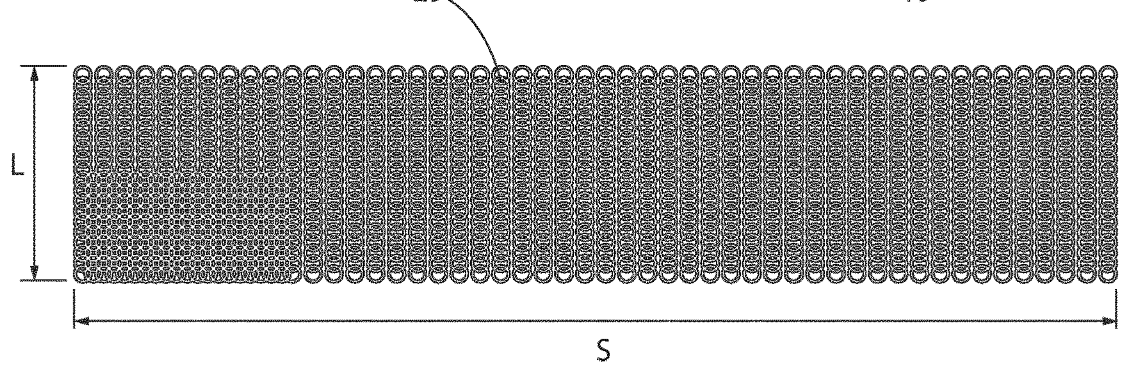
FIG. 7 shows a chain mail portion of the probe of the apparatus of FIG. 1.

The structure 17 further comprises a movable bar 22, which is connected to the pin 18 and is free to slide along the pin 18 between a lifted position (shown in FIGS. 5 and 6), in which the distance from the fixed bar 19 is the greatest and the space taken up in a direction transverse to the axis $X_{18}$ of the structure 17 is the smallest, and a test position (shown in FIGS. 2 and 3), in which the distance from the fixed bar 19 is the smallest and the space taken up in the direction transverse to the axis $X_{18}$ of the structure 17 is the greatest. The lifted position is used for the insertion of the arm 15 into the inner cavity 16 thanks to the minimum dimensions of the structure 17 in the direction transverse to the axis $X_{18}$; the presence of additional spreaders is therefore not required for the insertion into the inner cavity 16.

Each articulated arm 21A, 21B is obtained by means of a respective rod 23A, 23B, which is hinged, at a first end, to a respective end of the movable bar 22 by means of a respective articulation pin 24A, 24B. Each rod 23A, 23B carries, connected at a second end, a respective guide roller 25A, 25B, which is suited to slide on the surface of the inner cavity 16 when the structure 17 is in the test position.

Each articulated arm 21A, 21B further comprises a respective rod 26A, 26B, which is hinged, at a first end, to a respective appendage of the fixed bar 19 by means of a respective articulation pin 27A, 27B. Each rod 26A, 26B is further connected, at a second end, to a second end of a respective rod 23A, 23B by means of a respective articulation pin 28A, 28B.

The axes of the aforesaid articulation pins indicated with 24A, 24B, 27A, 27B and 28A, 28B are all parallel to one another and orthogonal to the axis $X_{18}$.

The probe 13 finally comprises a chain mail portion 29, which is connected to both rods 23A, 23B, preferably in the area of the articulation pins 28A, 28B. The chain mail portion 29 is made of an electrically conductive material. In particular, the chain mail portion 29 is made of a metal material. The chain mail portion 29 defines the second electrode of the high-voltage test system 8, as described more in detail below.

Figure 4:
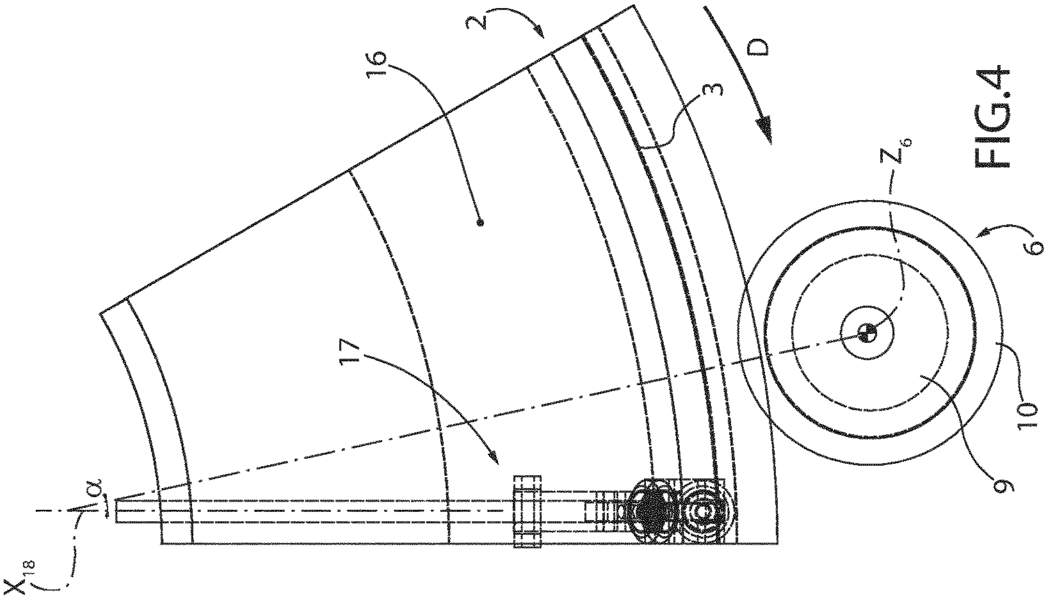
FIG. 4 is a cross-section view along line IV-IV.

The chain mail portion 29 has a length L of at least 3 cm; preferably, the length L of the chain mail portion 29 ranges from 8 to 15 cm. The chain mail portion 29 covers at least 3 cm of the innerliner along a substantially longitudinal direction (which correspond to the direction of rotation of the tire 2 indicated with arrow D in FIG. 4); preferably, the chain mail portion 29 covers from 8 to 15 cm of the innerliner along a substantially longitudinal direction (which correspond to the direction of rotation of the tire 2). The length L of the chain mail portion 29 is such that it engages a portion of the surface of the inner cavity 16 that covers at least the roller 6.

The width S of the chain mail portion 29, on the other hand, is defined by the distance of the two articulation pins 28A, 28B in the test position. The width S of the chain mail portion 29 is such that it engages the surface of the inner cavity 16 in the area of the crown, namely of the central portion of the carcass 3, and at least partially in the area of the sidewalls 4. The chain mail portion 29 covers an area of the innerliner along a transversal direction that corresponds to the crown and at least partially the sidewalls 4.

The chain mail portion 29 is designed to serve as a second electrode of the high-voltage test system 8, as described more in detail below.

The apparatus 1 further comprises an electronic control unit ECU, which controls the operation of the apparatus 1 and, in particular, controls the operation of the high-voltage test system 8. More in detail, the electronic control unit ECU is suited to supply the second electrode (namely, the chain mail portion 29) with pulses of approximately 25 kV, as described more in detail below.

According to a preferred variant, when the arm 15 is inserted in the inner cavity 16, the roller 6 is aligned with the axis $X_{18}$. In other words, the roller 6 and the structure 17 are not misaligned. According to a variant shown in FIG. 4, when the arm 6 is inserted in the inner cavity 16, the roller 6 and the structure 17 are not aligned. In particular, the roller 6 and the structure 17 are arranged so as to form an angle $\alpha$ ranging from 0 to 30°. More in detail, the length L of the chain mail portion 29 is such that it covers a portion of the surface of the inner cavity 16 that corresponding to said angle $\alpha$.

The second electrode (namely, the chain mail portion 29) is connected to the electronic control unit ECU and to a high-voltage power supply source 30. The first electrode (namely, the roller 6) is connected to the electronic control unit ECU, as well.

The strategy implemented by the electronic control unit ECU in order to check for the presence of defects in the tire 2 will be described below.

The method comprises, first of all, a preparation step, during which:

- the tire 2 is placed either manually (by an operator) or automatically (with a robot arm) on the support frame 5 and, in particular, on the rollers 6, 7;

the arm 15 is operated in order to be inserted into the inner cavity 16 with the structure 17 arranged in the lifted position, so that the structure 17 takes up a minimum space in a direction transverse to the axis $X_{18}$; and the bar 22 is controlled so as to move from the lifted position to the test position, in which the rollers 20, 25A, 25B are in contact with the surface of the inner cavity 16 and the chain mail portion 29 engages the surface of the inner cavity 16 in the area of the crown, namely in the central portion of the carcass 3, and at least partially in the area of the sidewalls 4.

On the other hand, the actual test step, which is subsequent to the preparation step, entails causing the rotation of the rollers 6, 7, which, in turn, cause the rotation of the tire 2 around the axis X. When the tire 2 rotates around the axis X, the second electrode (namely, the chain mail portion 29) slides on the entire surface of the inner cavity 16. Simultaneously, the second electrode (namely, the chain mail portion 29) is supplied with high-voltage pulses by the power supply source 30, thus creating an electric field around the second electrode (namely, around the chain mail portion 29).

In case the carcass 3 lacks defects (holes, cracks or irregularities in the innerliner, etc.), the carcass 3 provides an insulation between the first electrode (namely, the roller 6) and the second electrode (namely, the chain mail portion 29). On the contrary, in case the carcass 3 has defects (holes, cracks or irregularities in the innerliner, etc.), the carcass 3 does not ensure the insulation between the first electrode (namely, the roller 6) and the second electrode (namely, the chain mail portion 29) and the defect is detected by the electronic control unit ECU.

Once a rotation of the tire 2 around the axis X has been completed, the movable bar 22 is controlled so as to move from the test position to the lifted position, the arm 15 is extracted from the inner cavity 16 and the tire 2 is removed either manually (by an operator) or automatically (with a robot arm) from the support frame 5 in order to replace it with a tire 2 to be tested.

The advantages of the apparatus 1 for testing tires 2 disclosed in the description above are numerous and can evidently be assumed from the description above. In particular, the structure 17 can easily be inserted into any type of tire 2 without requiring any additional spreaders. Furthermore, the roller 6 is designed to adjust to the shape of the carcass 3 and to ensure, during the test step, a good contact with the entire portion of the tire 2 that is going to come into contact with the asphalt, namely with the crown and, at least partially, with the sidewalls 4. Finally, the high-voltage test system 8 recognizes defects (holes, cracks or irregularities on the innerliner, etc.) of the carcass 3 in a reliable manner and, especially, avoids wrong recognitions of defects.

LIST OF REFERENCE NUMBERS

1 apparatus for testing re-treaded tires
2 tire
3 carcass
4 sidewalls
5 support frame
6 roller
7 roller
8 high-voltage test system
9 central core
10 coating layer
11 outer surface
12 outer surface
13 probe
14 robot
15 arm
16 inner cavity
17 structure
18 pin
19 fixed bar
guide roller
21 articulated arm
22 movable bar
23 rod
24 articulation pin
guide roller
26 rod
27 articulation pin
28 articulation pin
29 chain mail portion
power supply source
X axis
$Z_6$ axis
$Z_7$ axis
X-axis
D arrow
ECU electronic control unit

The invention claimed is:

1. An apparatus for testing tires with a first central axis and having a toroidal carcass, which internally defines a cavity and supports a pair of sidewalls arranged on an outside of the carcass, wherein the apparatus comprises:

a roller configured to support the tire and cause the tire to rotate around the first central axis, wherein a central core of the roller comprises an electrically conductive material, and a coating layer of an even thickness is applied on an outside of the central core so as to completely and uniformly wound the central core;

wherein the roller is provided with an outer surface having a concave profile, with the concavity facing the tire;

a probe comprising a structure configured to adjust to an inner superficial profile of the cavity of the carcass and comprising an electrically insulating material;

a chain mail portion connected to the structure, comprising an electrically conductive material and having a width configured to engage a surface of the cavity in an area of a crown and, at least partially, in an area of the sidewalls, and further having a length configured to engage a portion of the surface of the cavity that covers at least the roller; and a high-voltage test system configured to detect a presence of defects in the carcass and comprising a pair of electrodes defined by the central core and by the chain mail portion.

2. The apparatus of claim 1, wherein a bending radius of the concave profile of the outer surface ranges from 68 to 240 centimetres.

3. The apparatus of claim 1, wherein a surface resistivity of the outer surface is in a range from $10*e^3$-$10*e^6$ Ω/sq cm.

4. The apparatus of claim 1, wherein the coating layer has a thickness less than or equal to 15 mm.

5. The apparatus of claim 4, wherein the thickness of the coating layer ranges from 4 mm to 15 mm.

6. The apparatus of claim 1, wherein the chain mail portion has a length ranging from 8 to 15 cm.

7. The apparatus of claim 1, wherein an innerliner is arranged on an inside of the carcass, and the chain mail portion covers at least 3 cm of an innerliner surface along a longitudinal direction.

8. The apparatus of claim 1, wherein the structure of the probe comprises a central pin, which has a second axis and is rigidly connected at one of its ends to a first fixed bar, and a second movable bar connected to the pin and which is free to slide along the pin between a lifted position, in which a distance from the first bar is greatest and a space taken up in a direction transverse to the second axis is smallest, and a test position, in which the distance from the first bar is smallest and the space taken up in the direction transverse to the second axis is greatest.

9. The apparatus of claim 8, wherein the first bar is provided with a first guide roller configured to slide on the profile of the inner cavity.

10. The apparatus of claim 8, wherein the structure of the probe comprises at least one articulated arm connected to the first bar and to the second bar.

11. The apparatus of claim 10, wherein the structure of the probe comprises a pair of articulated arms, which are arranged in a mirror-like manner relative to the second axis and are connected to the first bar and to the second bar.

12. The apparatus of claim 11, wherein each articulated arm comprises a respective first rod which is hinged at a first end to a respective end of the second bar via a respective first articulation pin.

13. The apparatus of claim 12, wherein each first rod carries, connected at a second end, a respective second guide roller which is configured to slide on the surface of the inner cavity.

14. The apparatus of claim 12, wherein each articulated arm comprises a respective second rod which is hinged, at a first end, to a respective appendage of the first fixed bar via a respective second articulation pin and is connected, at a second end, to a second end of a respective first rod via a respective third articulation pin.

15. The apparatus of claim 14, wherein respective axes of the first, second, and third articulation pins are parallel to one another and orthogonal to the second axis.

16. The apparatus of claim 14, wherein the chain mail portion is connected to the first rod in an area of the third articulation pins.

17. The apparatus of claim 1, wherein, when in use, the roller is aligned with an axis of the structure of the probe.

18. The apparatus of claim 1, wherein, when in use, the roller and the structure of the probe are arranged to form an angle ($\alpha$) ranging from 0 to 30°.

19. A method for testing tires with the apparatus of claim 1, the method comprising:

i) a preparation step comprising:
 placing a tire on the roller;
 inserting the probe into the inner cavity with the structure of the probe arranged in the lifted position; and
 moving the structure of the probe from the lifted position to the test position;

ii) a test step comprising:
 placing in rotation the roller which, in turn, causes the rotation of the tire around the first central axis;
 supplying the chain mail portion with high-voltage pulses; and
 testing for a defect on the carcass by verifying insulation between the roller and the chain mail portion;

iii) moving the structure from the test position to the lifted position and extracting the probe from the inner cavity once a complete rotation of the tire around the first central axis has been completed.

20. The method of claim 19, wherein the preparation step comprises inserting the probe into the inner cavity without widening the carcass therefor.

* * * * *